(12) United States Patent
Hazel et al.

(10) Patent No.: US 9,760,625 B2
(45) Date of Patent: Sep. 12, 2017

(54) METHOD AND SYSTEM FOR INDEXING IN DATASTORES

(71) Applicant: DEEP INFORMATION SCIENCES, INC., Waltham, MA (US)

(72) Inventors: Thomas Hazel, Andover, MA (US); Jason P. Jeffords, Bedford, NH (US); Gerard L. Buteau, Durham, NH (US)

(73) Assignee: DEEP INFORMATION SCIENCES, INC., Waltham, MA (US)

( * ) Notice: Subject to any disclaimer, the term of this patent is extended or adjusted under 35 U.S.C. 154(b) by 107 days.

(21) Appl. No.: 13/828,845

(22) Filed: Mar. 14, 2013

(65) Prior Publication Data

US 2013/0254208 A1    Sep. 26, 2013

Related U.S. Application Data

(60) Provisional application No. 61/613,830, filed on Mar. 21, 2012.

(51) Int. Cl.
*G06F 7/00* (2006.01)
*G06F 17/30* (2006.01)

(52) U.S. Cl.
CPC .. *G06F 17/30619* (2013.01); *G06F 17/30336* (2013.01)

(58) Field of Classification Search
CPC ......... G06F 17/30619; G06F 17/30336; G06F 17/30333
USPC .............. 707/673, 696, 711, 741, 743, 999.1
See application file for complete search history.

(56) References Cited

U.S. PATENT DOCUMENTS

| | | | |
|---|---|---|---|
| 5,819,204 A | 10/1998 | Moore et al. | |
| 6,928,488 B1 | 8/2005 | de Jong et al. | |
| 7,447,850 B1 | 11/2008 | Del Rosso et al. | |
| 7,558,786 B2 | 7/2009 | Robson et al. | |
| 7,689,633 B1 | 3/2010 | Li et al. | |
| 7,702,640 B1 * | 4/2010 | Vermeulen | G06F 17/30336 707/999.1 |
| 7,840,575 B2 | 11/2010 | Chandrasekaran | |
| 8,230,098 B2 * | 7/2012 | Chen et al. | 709/231 |
| 8,234,468 B1 | 7/2012 | Deshmukh et al. | |
| 8,347,050 B2 | 1/2013 | Bernstein et al. | |
| 8,533,598 B2 | 9/2013 | Meaney et al. | |
| 8,762,395 B2 | 6/2014 | Chandrasekaran | |
| 2003/0079019 A1 | 4/2003 | Lolayekar et al. | |
| 2006/0109765 A1 | 5/2006 | Chen | |
| 2006/0112155 A1 | 5/2006 | Earl et al. | |
| 2008/0027971 A1 * | 1/2008 | Statchuk | G06F 17/30864 |
| 2008/0091704 A1 | 4/2008 | Yennie | |
| 2008/0163160 A1 | 7/2008 | Bloesch et al. | |
| 2008/0209451 A1 | 8/2008 | Michels et al. | |
| 2009/0059757 A1 | 3/2009 | Haustein et al. | |

(Continued)

OTHER PUBLICATIONS

Chiu, K., et al. "The Proteus Multiprotocol Message Library". IEEE/ACM SC2002 Conference. 2002. pp. 1-9.

*Primary Examiner* — Md. I Uddin
(74) *Attorney, Agent, or Firm* — Arent Fox LLP

(57) ABSTRACT

A method, system, apparatus, and computer program product for indexing information stored in data-stores. The system receives a new index request. The system creates an index in response to the request. The new index includes at least one segment, a first flag, and a last flag. Each segment comprises index summary information. The system then stores the index in memory.

27 Claims, 21 Drawing Sheets

(56) References Cited

U.S. PATENT DOCUMENTS

2009/0180369 A1    7/2009   Kimmelmann et al.
2010/0191919 A1    7/2010   Bernstein et al.
2011/0161200 A1    6/2011   Carmona et al.
2012/0185526 A1*   7/2012   Kellermann et al. ......... 709/201

* cited by examiner

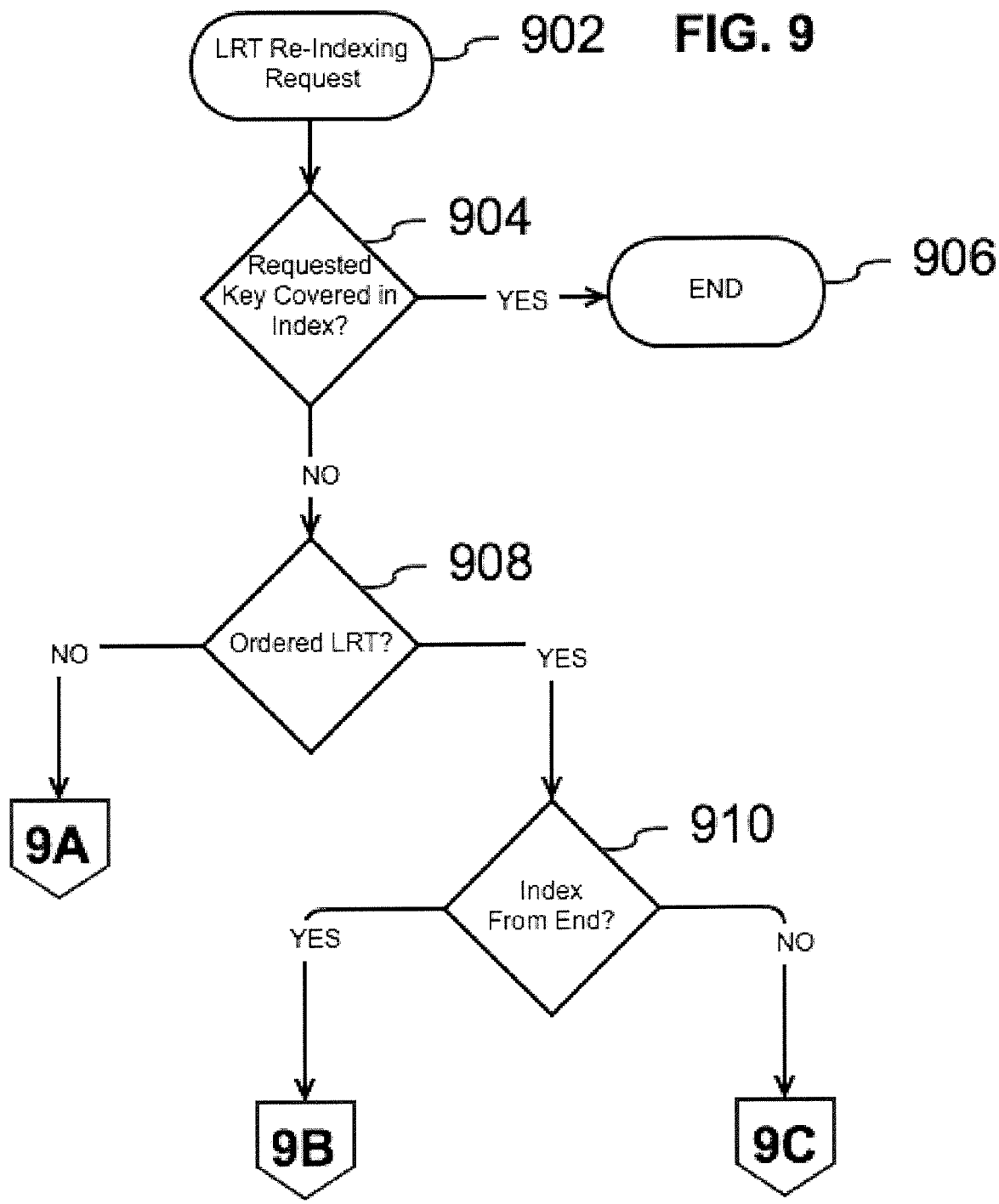

FIG. 11

IRT File

| Header |  |  |
|---|---|---|
| Segment Type and Size | | |
| Key Element | &Value | &Key |
| Key Element | &Value | &Key |
| Key Element | &Value | &Key |
| Key Element | &Value | &Key |
| Segment Type and Size | | |
| Segment Type and Size | | |
| Key Element | &Value | &Key |
| Key Element | &Value | &Key |
| Key Element | &Value | &Key |
| Key Element | &Value | &Key |
| Segment Type and Size | | |

IRT File

| Header | |
|---|---|
| Segment Type and Size | |
| Key Prefix | |
| Key Suffix | &V or &K |
| Key Suffix | &V or &K |
| Key Suffix | &V or &K |
| Key Prefix | |
| Key Suffix | &V or &K |
| Key Suffix | &V or &K |
| Segment Type and Size | |
| Segment Type and Size | |
| Key Prefix | |
| Key Suffix | &V or &K |
| Key Suffix | &V or &K |
| Key Suffix | &V or &K |
| Key Suffix | &V or &K |
| Segment Type and Size | |

IRT File

| Header | |
|---|---|
| Segment Type and Size | |
| Key Prefix | |
| Key Suffix | &Segment |
| Key Suffix | &Segment |
| Key Suffix | &Segment |
| Key Prefix | |
| Key Suffix | &Segment |
| Key Suffix | &Segment |
| Segment Type and Size | |
| Segment Type and Size | |
| Key Prefix | |
| Key Suffix | &Segment |
| Key Suffix | &Segment |
| Key Suffix | &Segment |
| Key Suffix | &Segment |
| Segment Type and Size | |

. . .

FIG. 20A
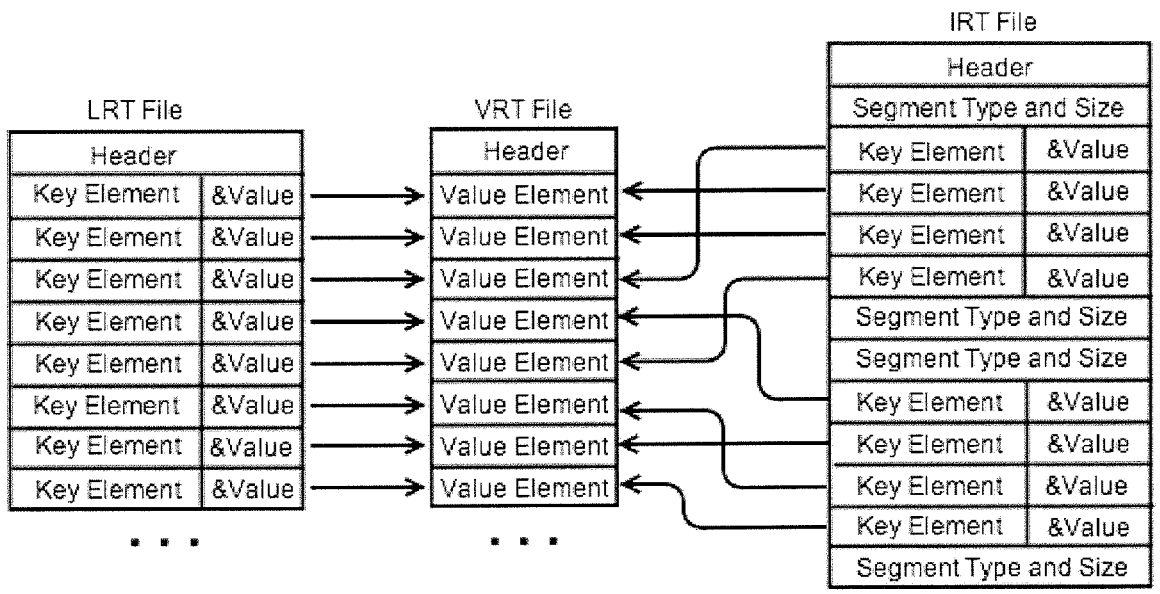
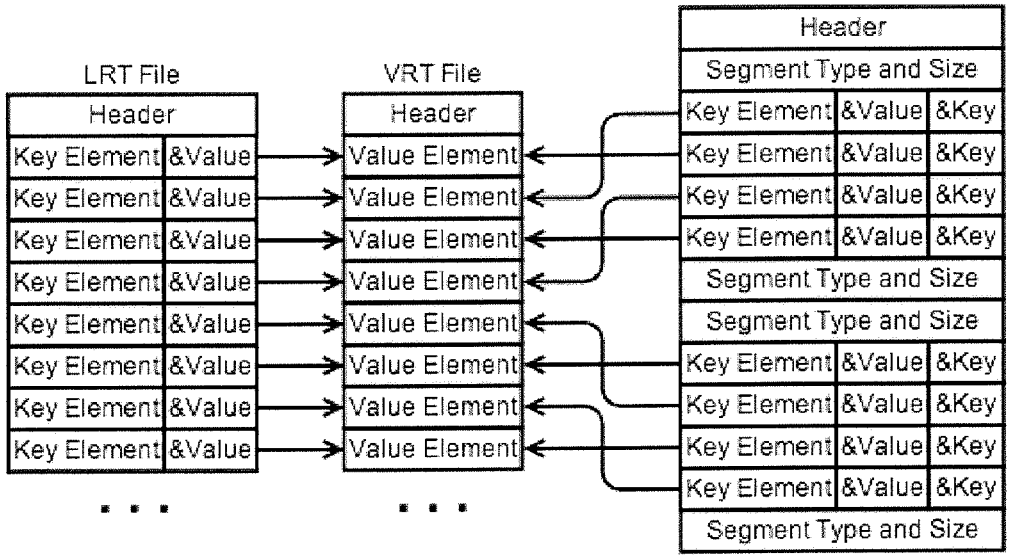
FIG. 20B

METHOD AND SYSTEM FOR INDEXING IN DATASTORES

CLAIM OF PRIORITY UNDER 35 U.S.C. §119

The present application for patent claims priority to Provisional Application No. 61/613,830 entitled "METHOD AND SYSTEM FOR INDEXING IN DATASTORES" filed Mar. 21, 2012, the entire contents of which are expressly incorporated by reference herein.

REFERENCE TO CO-PENDING APPLICATIONS FOR PATENT

The present application for patent is related to the following co-pending U.S. patent applications:
   U.S. patent application Ser. No. 13/781,339, entitled "METHOD AND SYSTEM FOR APPEND-ONLY STORAGE AND RETRIEVAL OF INFORMATION" filed Feb. 28, 2013, which claims priority to Provisional Application No. 61/604,311 entitled "METHOD AND SYSTEM FOR APPEND-ONLY STORAGE AND RETRIEVAL OF INFORMATION" filed Feb. 28, 2012, the entire contents of both of which are expressly incorporated by reference herein; and
   U.S. Provisional Application No. 61/638,886 entitled "METHOD AND SYSTEM FOR TRANSACTION REPRESENTATION IN APPEND-ONLY DATASTORES" filed Apr. 26, 2012, the entire contents of which are hereby expressly incorporated by reference herein.

BACKGROUND

Field

The present disclosure relates generally to a method, apparatus, system, and computer readable media for optimizing storage of information in both on-disk and in-memory representation, and more particularly, relates to optimized, sequential organization in files for both on-disk and in-memory representations of information Background Traditional datastores and databases use sequential log files and paged datastore/database files. This approach has many weaknesses that are difficult if not impossible to overcome without significant architectural and algorithmic changes. Such drawbacks include severe performance degradation with random access patterns; seeks occurring to random pages even with sequential data; data being written at least twice, once to the log file(s) and again to the datastore/database file(s); system startup and shutdown being very slow as log files are read/purged and error detection and correction is performed; and error recovery being very complex since data can be partially written to existing pages.

Additionally, traditional designs store operations and data in log files. Thereafter, this information is moved to paged database files by reprocessing the operations and data and/or purging memory. Pages are overwritten in the process.

SUMMARY

In light of the above described problems and unmet needs as well as others, systems and methods are presented for providing unique, highly optimized datastore indexing. Among other applications, this optimized indexing can be applied in append-only datastores.

For example, aspects of the present invention provide advantages such as optimization of reads and writes for sequential disk access, data is written only once, indexes reference data values rather than data being replicated, startup and shutdown are instantaneous, and error recovery is extremely simple as data and indexes are never overwritten.

Append-only operation dramatically increases write performance and durability. Aspects presented herein provide techniques to implement functionality and maximize performance, e.g., in an append-only application.

Additional advantages and novel features of these aspects of the invention will be set forth in part in the description that follows, and in part will become more apparent to those skilled in the art upon examination of the following or upon learning by practice thereof.

BRIEF DESCRIPTION OF THE DRAWINGS

Various aspects of the systems and methods will be described in detail, with reference to the following figures, wherein:

FIGS. 9, 9A, 9B, and 9C are flow charts illustrating various aspects of an example method of incrementally regenerating an in-memory index from a plurality of keys and virtual segments, in accordance with aspects of the present invention;

FIG. 11 illustrates an example logical representation of a segmented column store, in accordance with aspects of the present invention;

FIG. 12 illustrates an example logical representation of a compact segmented column store, in accordance with aspects of the present invention;

FIG. 14 illustrates an example logical representation of summary segments, in accordance with aspects of the present invention;

FIG. 20A-20B illustrates an example LRT, VRT, and IRT file according to aspects of the present invention.

DETAILED DESCRIPTION

Figure 1:
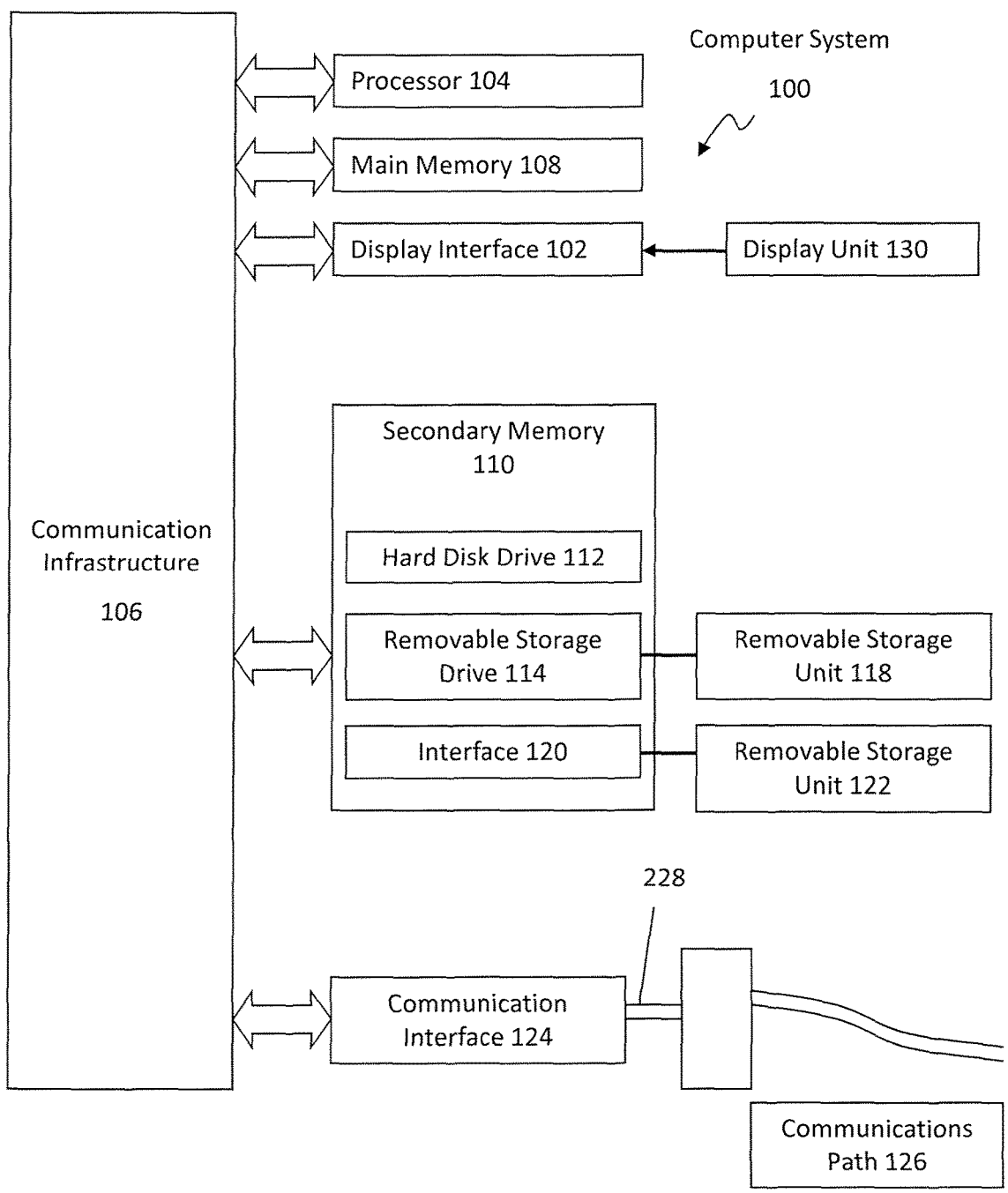
FIG. 1 presents an example system diagram of various hardware components and other features, for use in accordance with aspects of the present invention.

These and other features and advantages in accordance with aspects of this invention are described in, or will become apparent from, the following detailed description of various example illustrations and implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of systems capable of providing optimized, sequential representations of information for both disk and memory, in accordance with aspects of the present invention will now be presented with reference to various apparatuses and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented using a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example illustrations, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random-access memory (RAM), read-only memory (ROM), Electrically Erasable Programmable ROM (EEPROM), compact disk (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 presents an example system diagram of various hardware components and other features, for use in accordance with an example implementation in accordance with aspects of the present invention. Aspects of the present invention may be implemented using hardware, software, or a combination thereof, and may be implemented in one or more computer systems or other processing systems. In one implementation, aspects of the invention are directed toward one or more computer systems capable of carrying out the functionality described herein. An example of such a computer system 100 is shown in FIG. 1.

Computer system 100 includes one or more processors, such as processor 104. The processor 104 is connected to a communication infrastructure 106 (e.g., a communications bus, cross-over bar, or network). Various software implementations are described in terms of this example computer system. After reading this description, it will become apparent to a person skilled in the relevant art(s) how to implement aspects of the invention using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably RAM, and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

In alternative implementations, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an EPROM, or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 114, a hard disk installed in hard disk drive 112, and signals 128. These computer program products provide software to the computer system 100. Aspects of the invention are directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features in accordance with aspects of the present invention, as discussed herein. In particular, the computer programs, when executed, enable the processor 110 to perform various features. Accordingly, such computer programs represent controllers of the computer system 100.

In an implementation where aspects of the invention are implemented using software, the software may be stored in a computer program product and loaded into computer system 100 using removable storage drive 114, hard drive 112, or communications interface 120. The control logic (software), when executed by the processor 104, causes the processor 104 to perform various functions as described herein. In another implementation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another implementation, aspects of the invention are implemented using a combination of both hardware and software.

Figure 2:
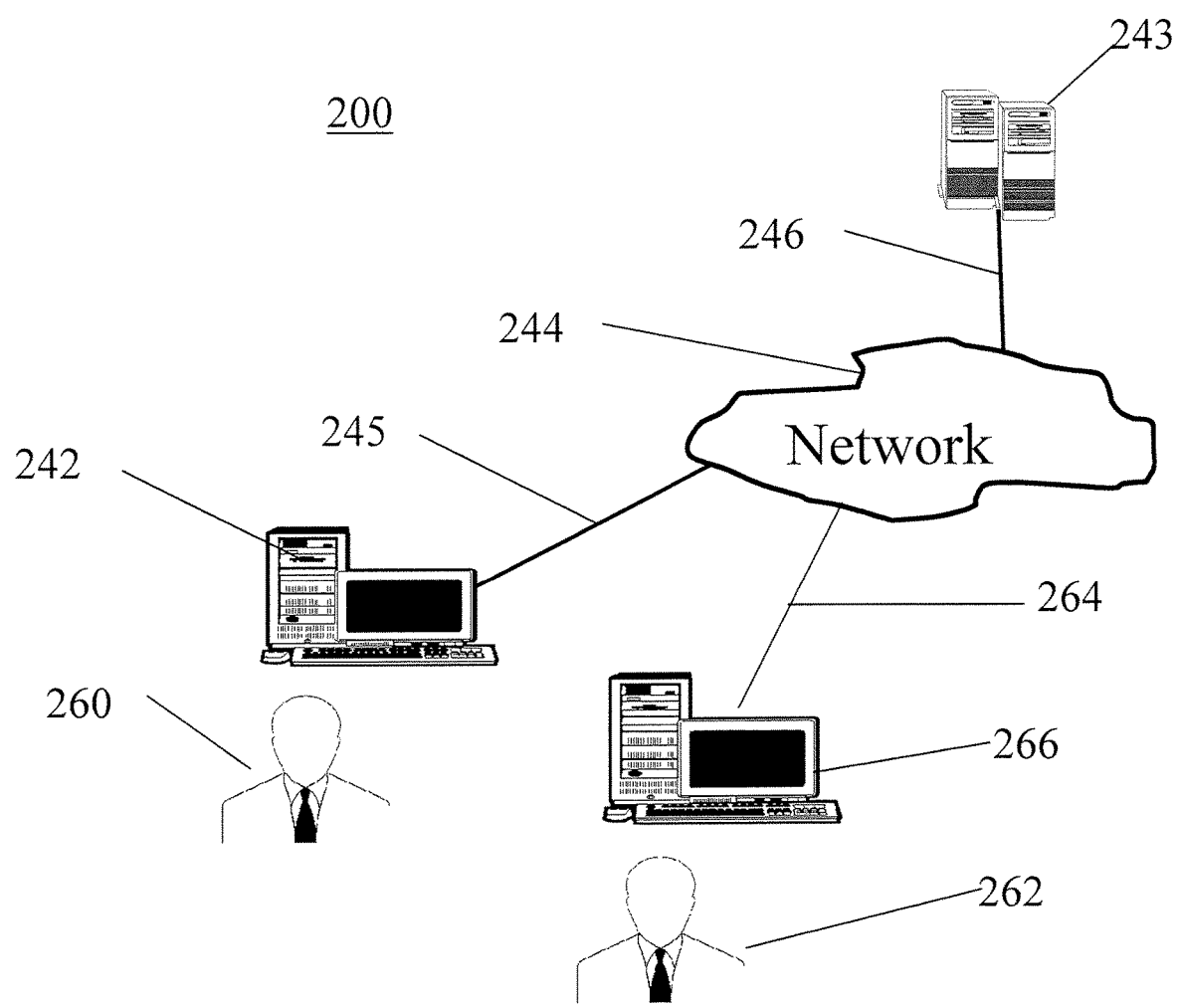
FIG. 2 is a block diagram of various example system components, in accordance with aspects of the present invention.

FIG. 2 is a block diagram of various example system components, in accordance with aspects of the present invention. FIG. 2 shows a communication system 200 usable in accordance with the aspects presented herein. The communication system 200 includes one or more accessors 260, 262 (also referred to interchangeably herein as one or more "users" or clients) and one or more terminals 242, 266. In an implementation, data for use in accordance with aspects of the present invention may be, for example, input and/or accessed by accessors 260, 264 via terminals 242, 266, such as personal computers (PCs), minicomputers, mainframe computers, microcomputers, telephonic devices, or wireless devices, such as personal digital assistants ("PDAs") or a hand-held wireless devices coupled to a server 243, such as a PC, minicomputer, mainframe computer, microcomputer, or other device having a processor and a repository for data and/or connection to a repository for data, via, for example, a network 244, such as the Internet or an intranet, and couplings 245, 246, 264. The couplings 245, 246, 264 include, for example, wired, wireless, or fiberoptic links.

When information is naturally ordered during creation, there is no need for a separate index, or index file, to be created and maintained. However, when information is created in an unordered manner, anti-entropy algorithms may be required in order to increase and lookup performance.

Anti-entropy algorithms, e.g., indexing, garbage collection, and defragmentation, help to restore order to an unordered system. These operations may be parallelizable. This enables the operations to take advantage of idle cores in multi-core systems. Thus, read performance is regained at the expense of extra space and time, e.g., disk indexes and background work.

Over time, append-only files may become large. Files may need to be closed and/or archived. In this case, new Real Time Key Logging (LRT) files, Real Time Value Logging (VRT) files, and Real Time Key Tree Indexing (IRT) files can be created, and new entries may be written to these new files. An LRT file may be used to provide key logging and indexing for a VRT file. An IRT file may be used to provide an ordered index of VRT files. LRT, VRT, and IRT files are described in more detail in U.S. patent application Ser. No. 13/781,339, entitled "METHOD AND SYSTEM FOR APPEND-ONLY STORAGE AND RETRIEVAL OF INFORMATION" filed Feb. 28, 2013, which claims priority to U.S. Provisional Application No. 61/604,311, filed on Feb. 28, 2012, titled "Method and System for Append-Only Storage and Retrieval of Information," the entire contents of which are incorporated herein by reference. Forming an index requires an understanding of the type of keying and how the files are organized in storage, e.g., how the on-disk index files are organized. An example logical illustration of file layout and indexing with an LRT file, VRT file, and IRT file is shown in FIG. 20A-20B.

Figure 3:
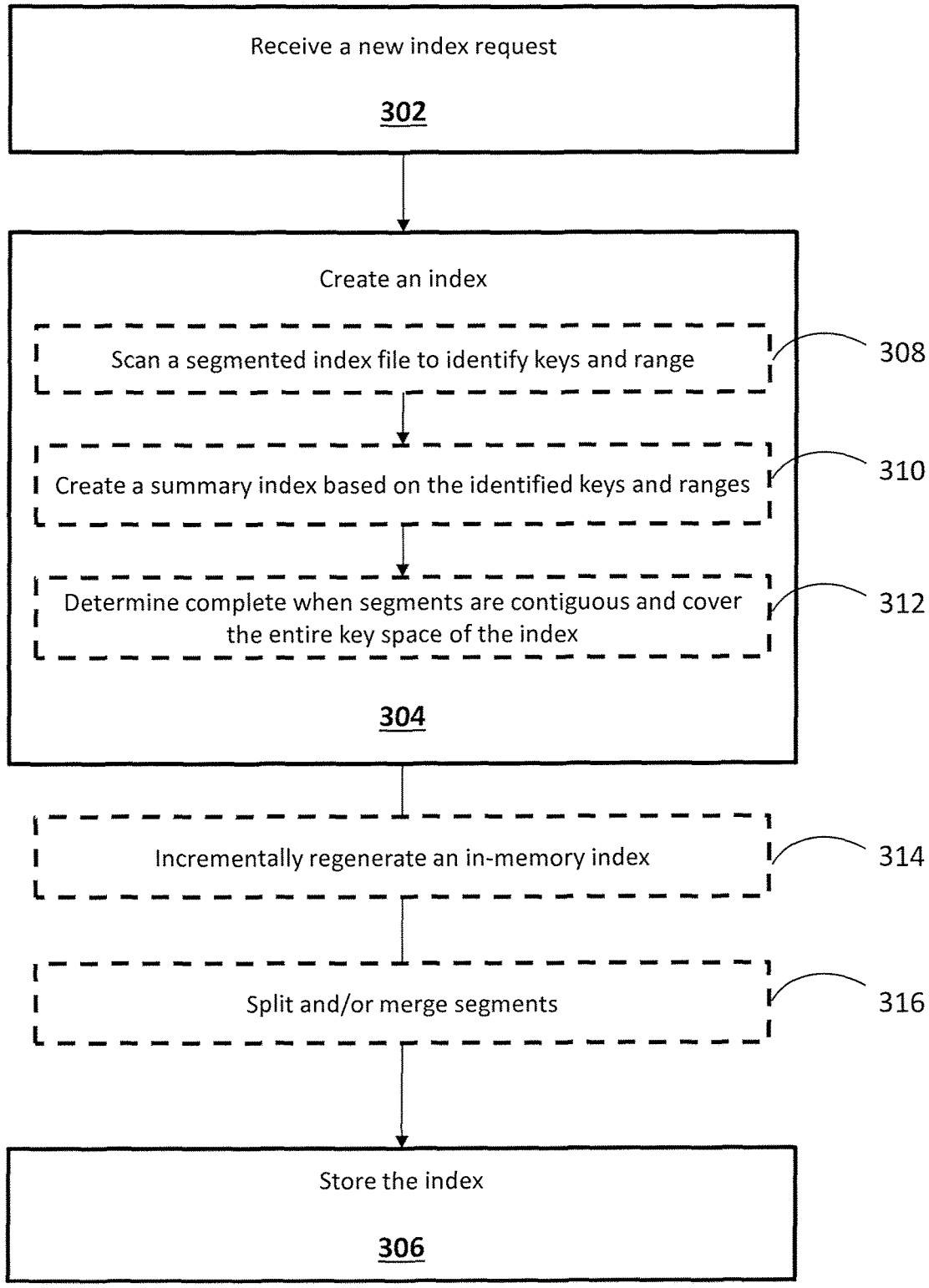
FIG. 3 is a flow chart illustrating an example method of indexing information, in accordance with aspects of the present invention.

FIG. 3 presents a flow chart illustrating aspects of an automated method 300 of indexing information stored in data-stores. Optional aspects are illustrated using a dashed line. The information may be, e.g., stored in an append-only manner. At 302, a new index request is received. The new index request may be driven by any of a create operation, a read operation, an update operation, and a delete operation.

At 304, an index is created in response to the request. The new index comprises at least one segment, a first flag, and a last flag. Each segment may include any of index summary information, key elements, key pointers, and value pointers. Index summary information may include a covered key range, first and last segment flags, next segment start key, and key summary filters. For example, a key summary filter may be a bloom filter.

Creating the index 304 may include scanning a segmented index file by segment to identify keys and their corresponding range 308, and creating a summary index based on the indentified keys and ranges 310. A determination may be made that the summary index is complete, e.g., when contiguous segments have been identified that cover the entire key space of the index 312. Segments may, e.g., identify other segments that they modify through segment back referencing. Summary segments may identify, e.g., each of a plurality of first keys and their corresponding segments.

At 306, the index is stored in memory. The index may be, e.g., distributed. Such a distributed index may be subdivided among nodes based on key ranges. Multiple nodes may comprise the same key range.

The method may further include incrementally regenerating an in-memory index 314.

For example, each segment may include range covering indexes. Then, the method may further include incrementally regenerating an in-memory index from a plurality of segments.

When the information is stored in a datastore in an append-only manner, an append-only index file may include ordered keys and/or unordered keys. When the index file includes ordered keys, incrementally regenerating an in-memory index 314 may be performed from the ordered keys using key sampling. The key sampling may be performed, e.g., at segment size boundaries. Key sampling may also include searching for key transitions in order to identify duplicate keys.

The method may also include organizing an index file, such as splitting and/or merging segments 316. Splitting segments is described in more detail in connection with FIG. 5. A segment may be split based on a split threshold. Such a split threshold may be determined based either on policy or on dynamic optimization criteria. Merging segments is described in more detail in connection with FIG. 6. Similarly, a segment may be merged based on a merge threshold. Such a merge threshold may be determined based on either policy or dynamic optimization criteria.

Aspects may further include any of covering a key space by indicting at least first key and next segment key in each segment and summary segment, indicating deleted first keys within segments and summary segments, ensuring a covered key space remains covered during organization operations, and streaming index changes to an index file in a append-only manner. For example, ensuring a covered key space remains covered may include maintaining a covered key space during organization operations.

Aspects may further include creating multiple indexes, each having a different order. Another aspect may include creating multiple indexes each having different covering key sets. Aspects may include creating multiple indexed caches of keys and values based on access patterns.

Aspects may include organizing LRT and VRT files based on index order and creating non-authoritative index ordered LRT and VRT files.

In an aspect the steps described in connection with FIG. 3 may be performed, e.g., by a processor, such as 104 in FIG. 1.

Figure 4:
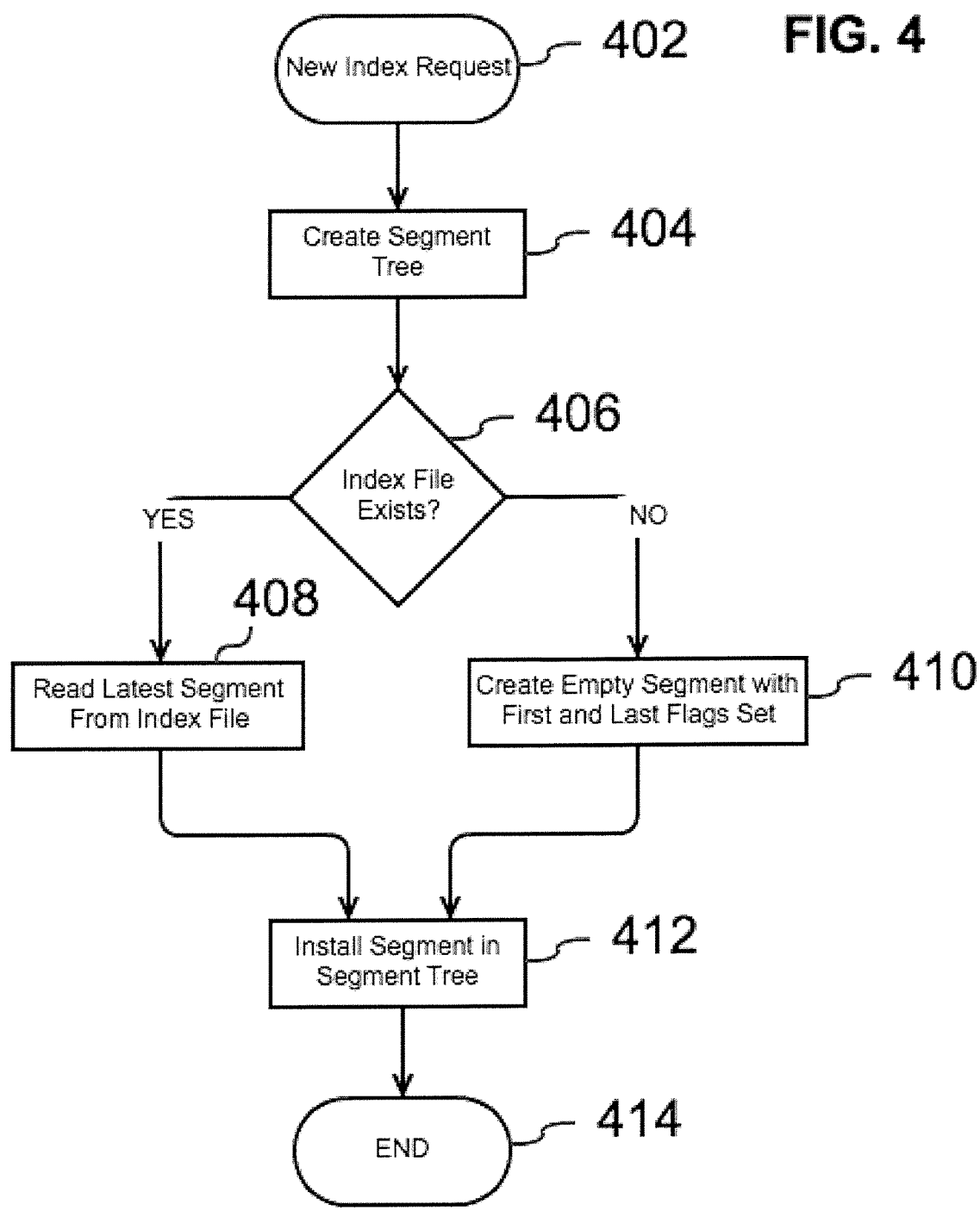
FIG. 4 is a flow chart illustrating an example method of creating a new index, in accordance with aspects of the present invention.

FIG. 4 illustrates a flow chart illustrating aspects of an automated method 400 of receiving a new index request at 402 and creating a new index. An index may comprise a plurality of segments. Each segment covers a key range. The index may be for any of a LRT, IRT, and VRT file. At 404 a new segment tree is created to house the segments of the new index. If an index file exists at 406 that index file is used to seed the index by reading the latest segment from the index file at 408. If an index file does not exist the segment is seeded with an empty segment spanning the entire index key space at 410. This "dummy" segment is fully formed but empty. The segment is then installed in the segment tree at 412 and the method ends at 414.

Figure 5:
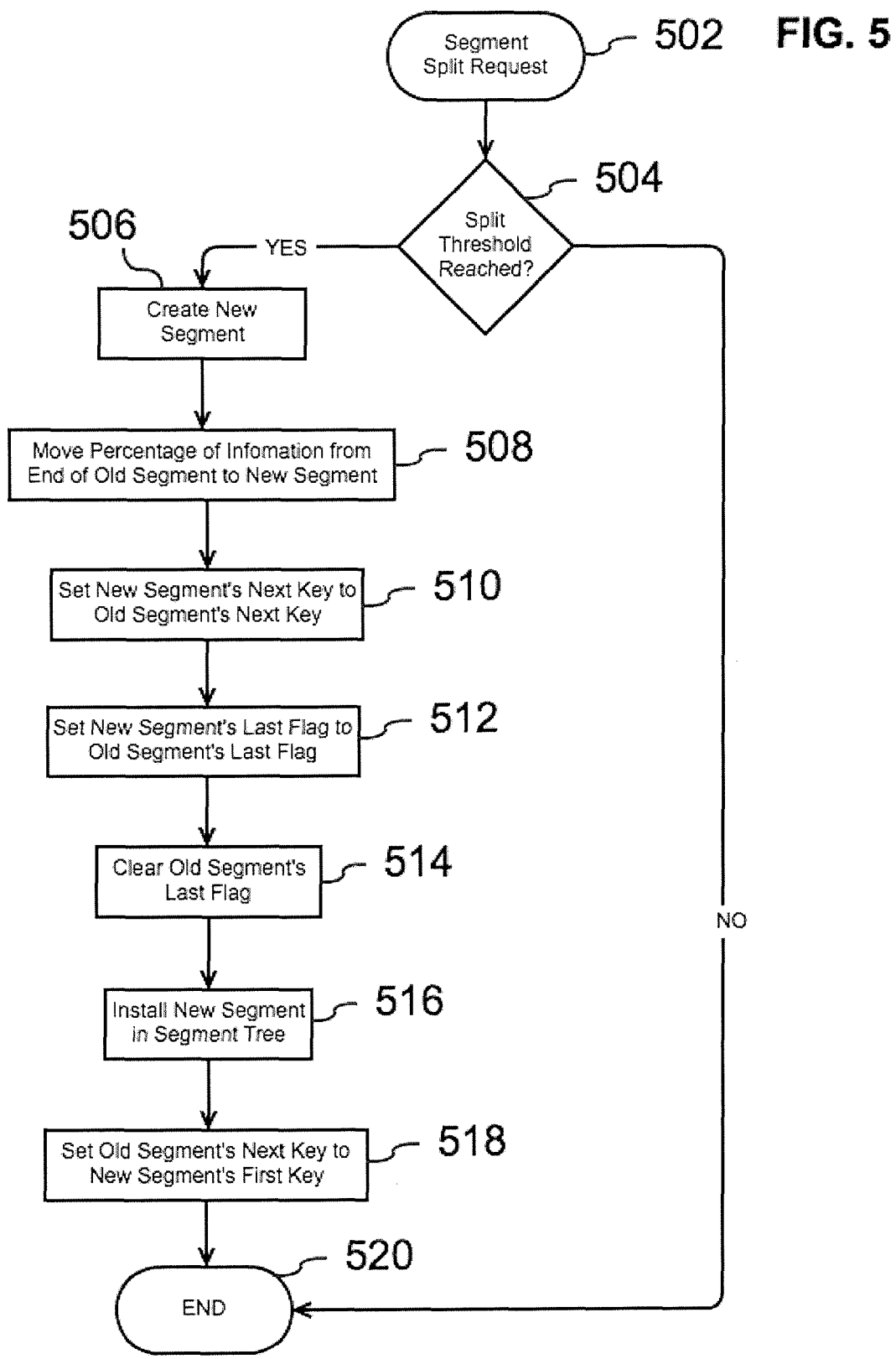
FIG. 5 is a flow chart illustrating an example method of splitting a segment, in accordance with aspects of the present invention.

FIG. 5 illustrates a flow chart illustrating aspects of an automated method 500 of receiving a split segment request at 502 and splitting the segment if the split threshold is reached at 504. If the split threshold is not reached the method ends at 516 without doing any work.

When the split threshold is reached a new segment is created in 506 and a percentage of information is moved from the end of the segment being split, the old segment, into the new segment at 508. This percentage can be controlled algorithmically. For example, when max segment size is reached and the process is not concurrent ⅓ of the old segment is moved to the new segment. When concurrent and key additions are sequentially clustered by thread (e.g. grouped by thread), an attempt is made to reach max segment size per thread before splitting segments.

Once the information has been moved from the end of the old segment to the new segment, the new segment's next key is set to the old segment's next key at 510. The new segment's last flag is set to the old segment's last flag at 512, and the old segment's last flag is cleared at 514. At 516 the new segment is installed in the segment tree. Setting the old segment's next key to the new segment's first key at 518 and then ending at 520 completes the split operation. In some variations, the keys are always appended. Thus, steps 510, 512, and 514 maintain the adjacent nature of the segments.

Figure 6:
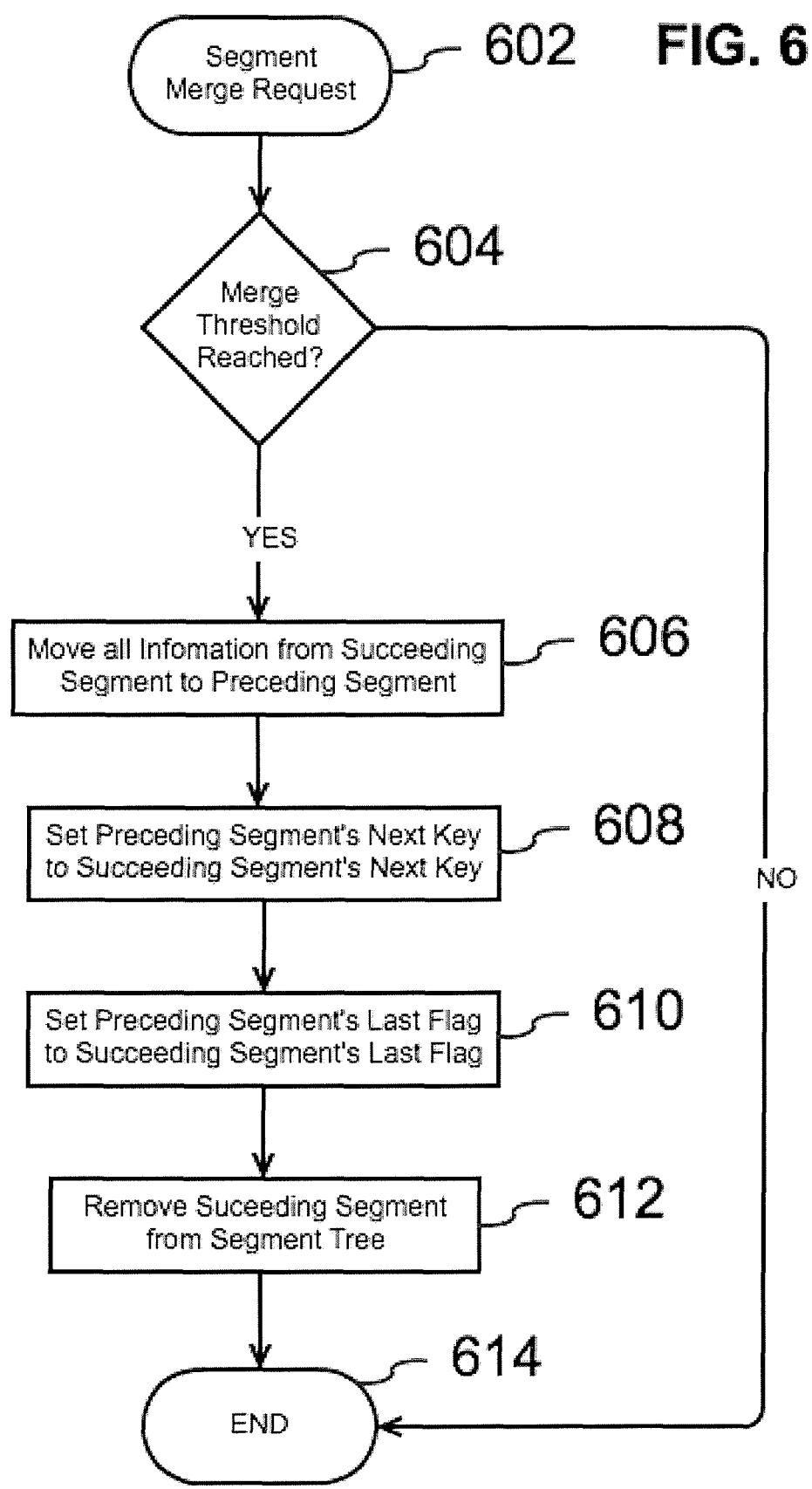
FIG. 6 is a flow chart illustrating an example method of merging a segment, in accordance with aspects of the present invention.

FIG. 6 illustrates a flow chart illustrating aspects of an automated method 600 of receiving a segment merge request at 602 and merging the segment if the merge segment threshold is reached at 604. If the merge threshold is not reached the method ends at 614 without doing any work.

When the merge threshold is reached all information from the succeeding segment is moved to the preceding segment at 606. Once the information has been moved the preceding segment's next key is set to the succeeding segment's next key at 608 and the preceding segment's last flag is set to the succeeding segment's last flag at 610, thereby joining the two segments. Thus, the merged segment maintains the same key space as the two original segments, but the flags have been moved. The succeeding segment is then removed from the segment tree at 612 and the method ends at 614.

Whether the segments in an index file are split or merged, the same key space is maintained.

Figure 7:
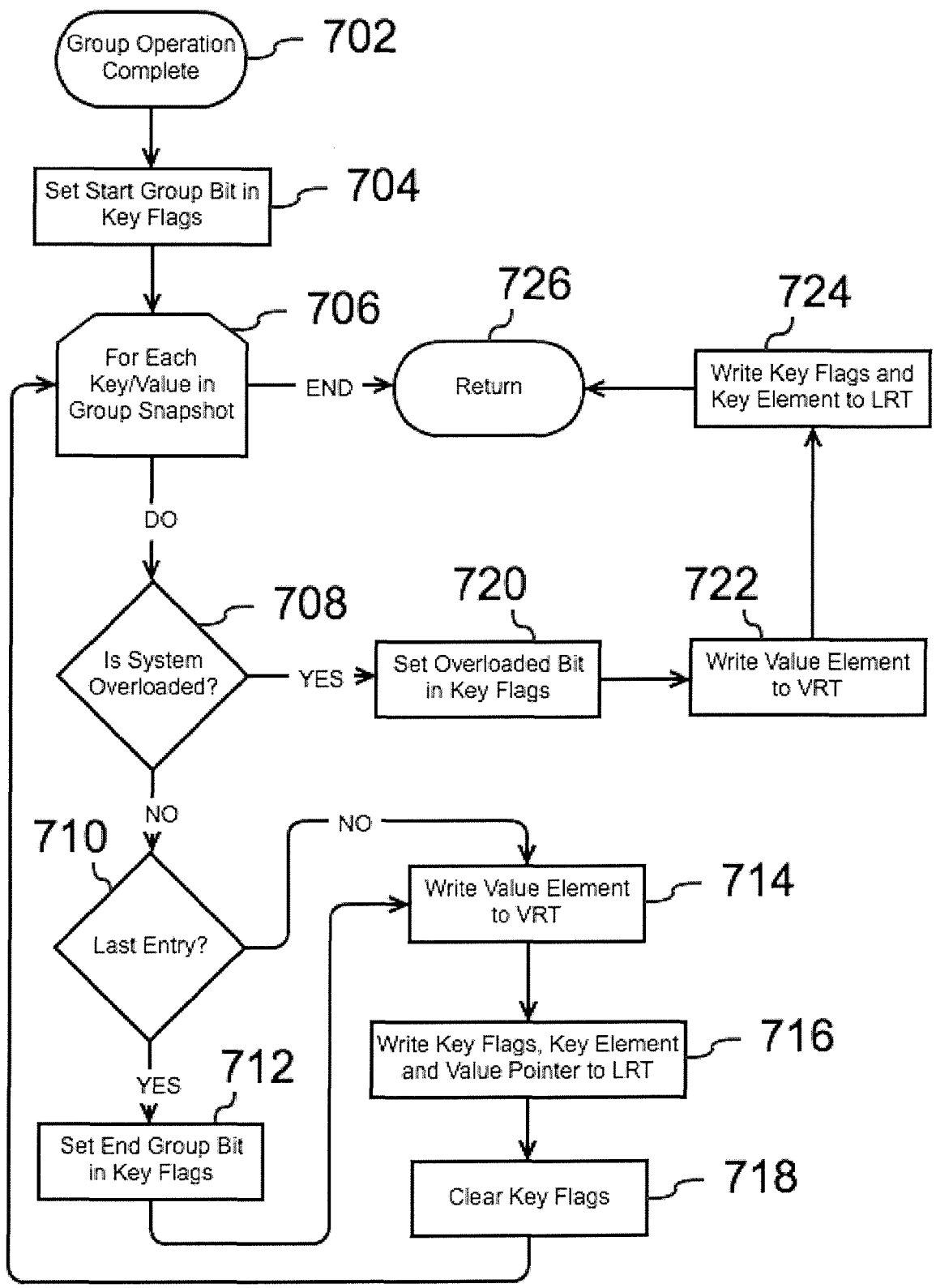
FIG. 7 is a flow chart illustrating an example method of streaming LRT and VRT files, in accordance with aspects of the present invention.

FIG. 7 illustrates a flow chart illustrating aspects of an automated method 700 of streaming LRT and VRT files upon group operation completion in 702. When each group operation completes the start group bit in key flags is set in 704 to indicate the start of the next group operation. Each key/value in the group snapshot is then traversed in 706 until all key/value pairs have been traversed, the loop ends and the process returns at 726 or the system is overloaded as detected at 708 and the loop terminates after overload processing starting at 720.

When an overload occurs setting the overload bit in the key flags in 720 and then writing the value element to the VRT in 722 and the key element to the LRT in 724 indicate the overload. Since the remainder of the key/value pairs is not processed the overload indication implies information is lost. After the overload indication is written the process returns at 726.

Under normal operation the system is not overloaded and processing continues at 710 where a check is performed to determine if this is the last key/value entry. If this is the last entry, the end group bit is set in 712. The value element is then written to the VRT in 714 and the key flags, key element and value pointer are written to the LRT file in 716. Once all elements have been written the key flags are cleared in 718 and key/value entry processing is restarted at 706.

Figure 8:
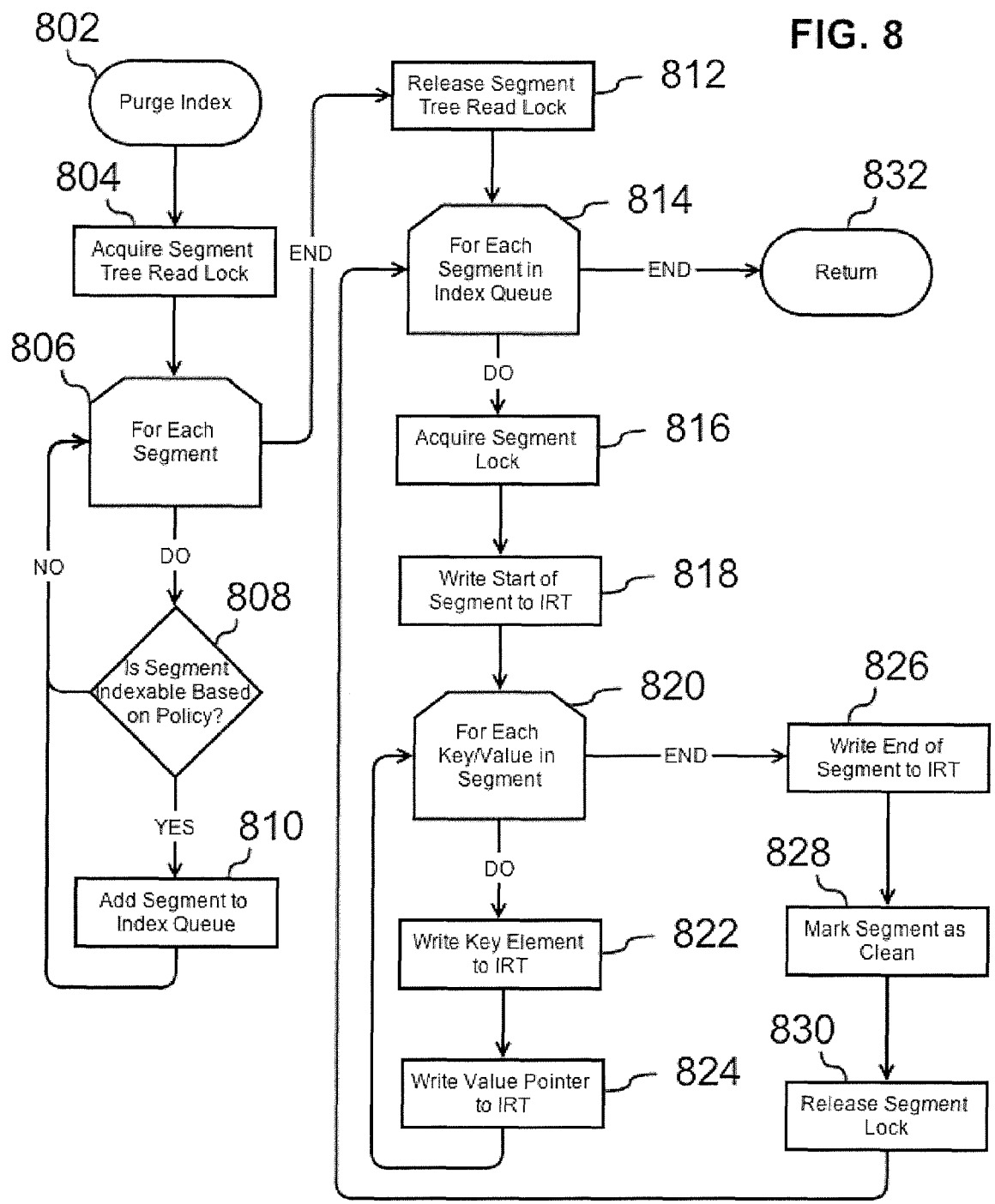
FIG. 8 is a flow chart illustrating an example method of streaming indexes upon a purge index request, in accordance with aspects of the present invention.

FIG. 8 illustrates a flow chart illustrating aspects of an example automated method 800 of streaming indexes upon a purge index request starting at 802. At 804 the segment tree read lock is acquired and then each segment within the index is traversed at 806. Each segment is checked to determine if it is indexable based on indexing policies (e.g. is the segment dirty) at 808. If the segment is indexable it is added to the index queue in 810 and the process continues at 806. If the segment is not indexable in 808 the process continues at 806. Segments are marked as dirty when they are modified.

After each segment has been scanned in 806 the segment tree read lock is released in 812 and each segment in the index queue is traversed in 814. As each segment is traversed its lock is acquired in 816, a start segment indication is written to the IRT at 818 and then each key/value within the segment is traversed in 820. Each key element in 822 and value pointer in 824 is written to the IRT. Once all key/value entries are traversed an end segment indication is written to the IRT at 826, the segment is marked as clean at 828 and the segment lock is released at 830. The next segment is then traversed in 814 and the process ends at 832 once all segments have been traversed.

FIGS. 9, 9A, 9B, and 9C are flow charts illustrating aspects of an example automated method 900 of incrementally regenerating an in-memory index from a plurality of keys and virtual segments. Among other benefits, incremental re-indexing improves both run-time and start-up time associated with information that is stored in an append-only manner. An LRT file re-indexing request is received at 902. If the requested key is not covered in the index, as determined at 904, the index is incrementally loaded from the LRT file starting at 908. If it is determined that the requested key is covered in the index at 904, the method ends at 906 without doing any work.

When it is determined that the requested key is not covered in the index, i.e., at 904, the index must be regenerated from the LRT file. At 908, it is determined whether the LRT file is ordered. If it is determined that the LRT is not ordered at 908, the LRT file must be sequentially scanned starting from its end (see FIG. 9A). In this case the file is scanned, and a previous key is read at 912. At 914, it is determined whether the key has been read, e.g., whether the file has any remaining key elements. If the previous key is read, it is installed in the index at 916. Then, the index is checked for the requested key at 918. If it is determined that the requested key is not in the index the scanning process continues at 912. If it is determined that the requested key is in the index at 918 or if is determined that the key could not be read at 914, the method ends at 920.

Figure 9A:
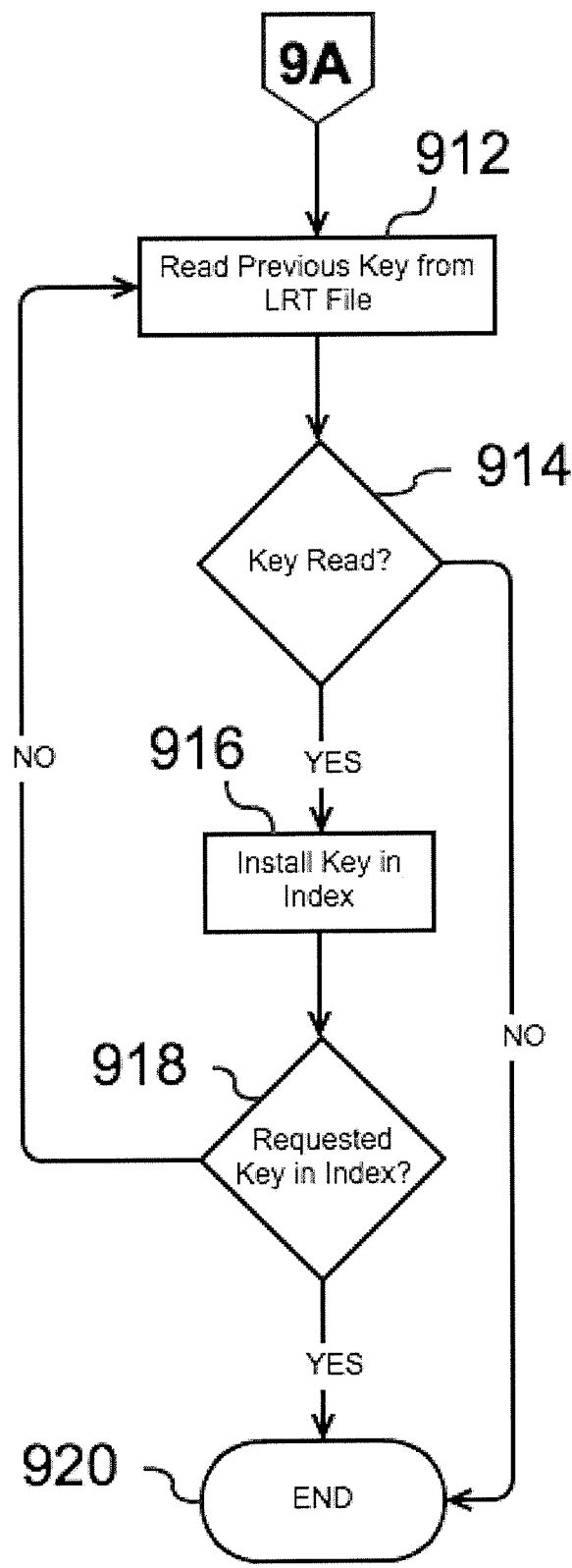
Figure 9B:
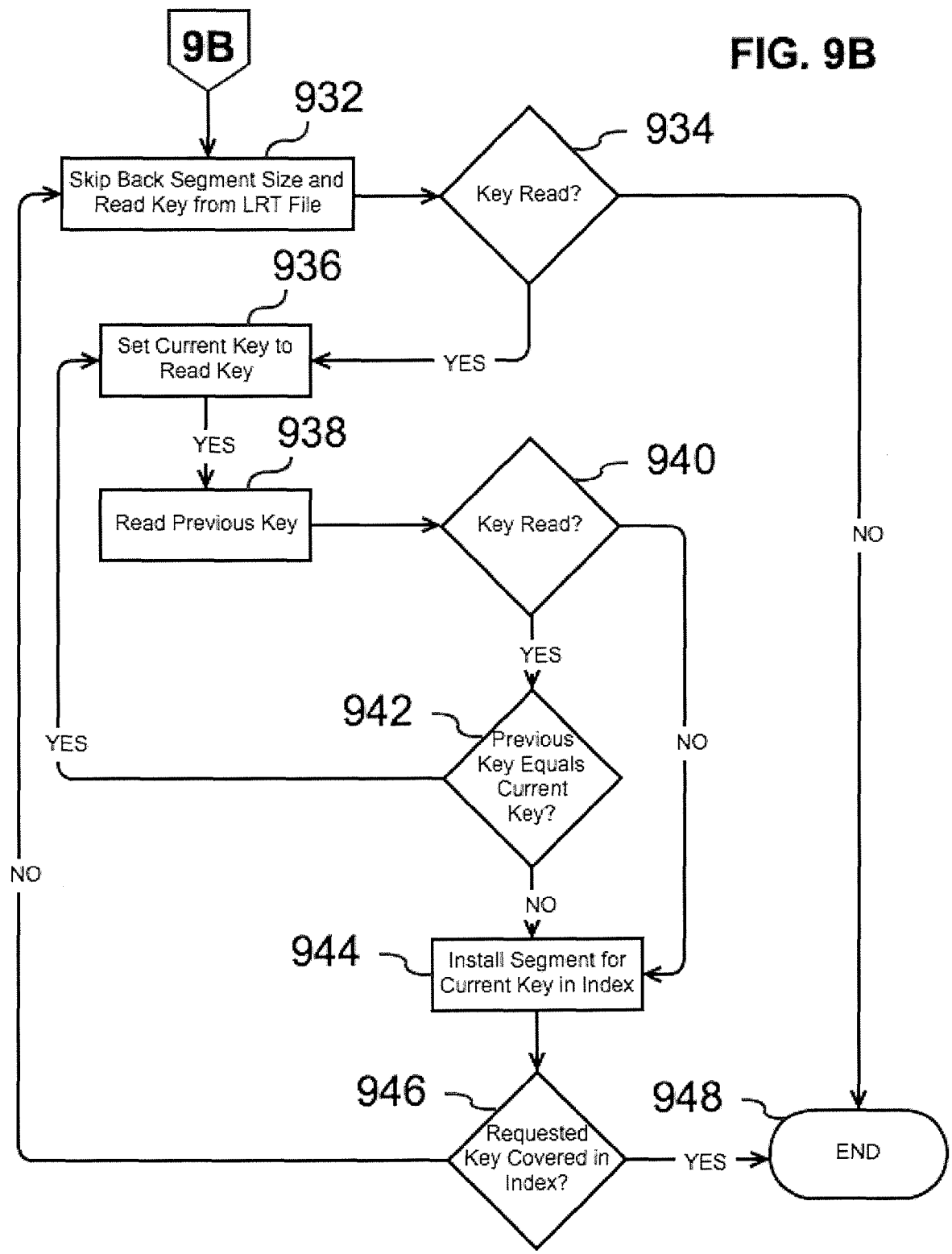

In FIG. 9, if it is determined that the LRT is ordered at 908 the indexing direction is determined at 910. When indexing is done from the end of the LRT file, the process proceeds to the steps illustrated in FIG. 9B. The segment size is skipped backwards through the file (e.g. the file read cursor is rewound segment size bytes), and the key at that location is read in 932. Segment size may be inferred. At 934, it is determined whether a key was read, e.g., whether the file contained any remaining keys. If a key was read, as determined at 934, the current key is set to the read key at 936. Then, the previous key is read at 938. At 940, a determination is made as to whether the previous key was read. When a previous key is read, as determined at 940, the previous key is checked to determine if it equals the current key at 942. If the previous key does equal the current key the process continues to scan previous keys starting at 936. This enables the process to identify duplicate keys. If the previous key could not be read, as determined in 940, or if the previous key does not equal the current key, the segment for the current key is installed at 944. When the previous key does not equal the current key, it indicates that an edge of the segment has been found.

Once a previous key is not equal to the current key as determined at 942, there has been a key transition and the segment for the current key is installed in the index at 944. At 946, a determination is made whether the requested key is now covered in the index. If the requested key is not covered in the index as determined at 946 the process continues at 932. When a key cannot be read at 934 or a requested key is determined to be covered in the index in 946, the method ends at 948.

Figure 9C:
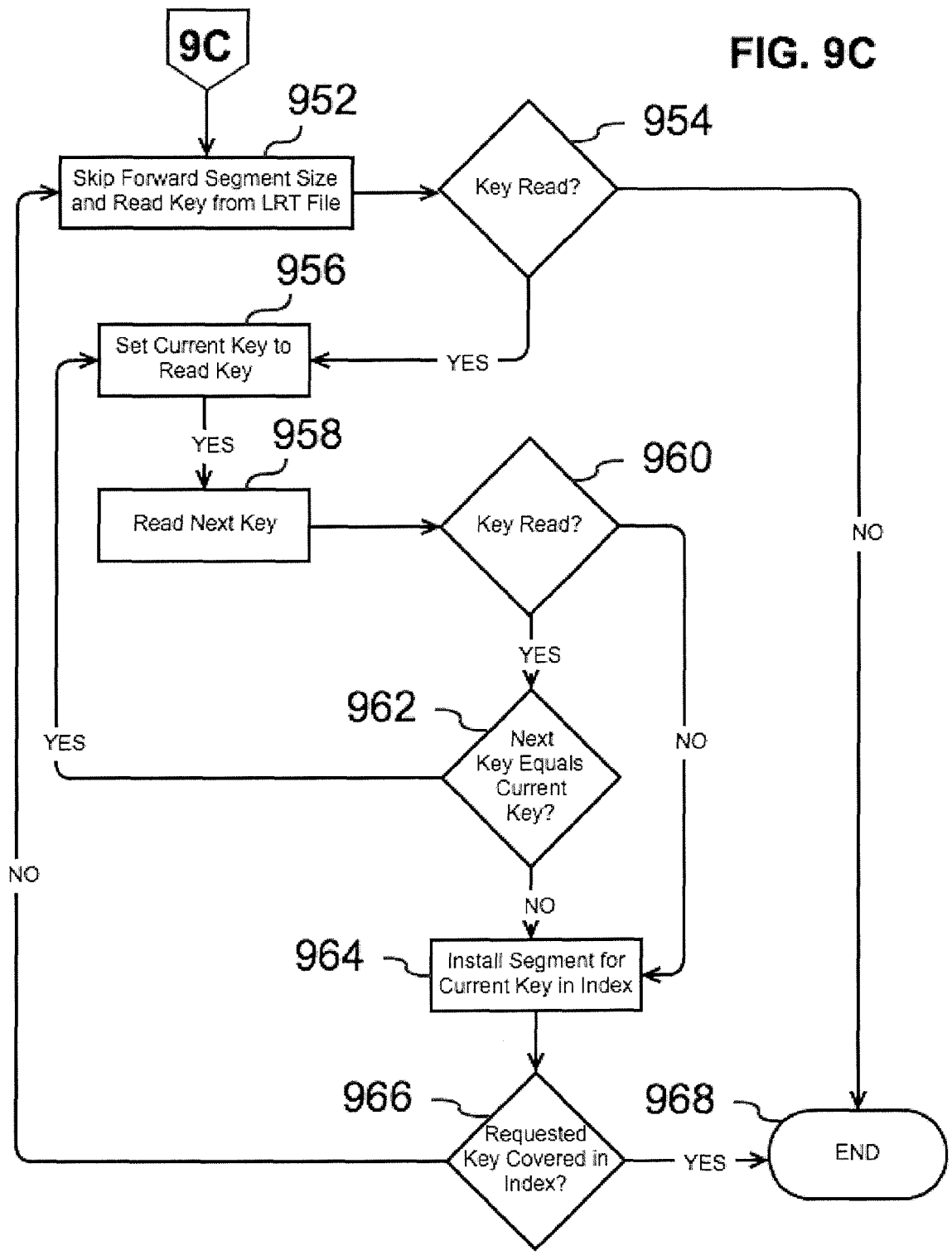

In FIG. 9, if the indexing direction determined at 910 indicates a forward file traversal, the process proceeds to FIG. 9C. Indexing starts at the beginning of the LRT file at 952. When indexing is performed from the beginning of the LRT file, segment size is skipped forward through the file, and the key at that location is read in 952. At 954, a determination is made as to whether a key has been read. If a key was read, as determined at 954, the current key is set to the read key at 956. Then, the next key is read at 958. When a next key is read, as determined at 960, the next key is checked to determine if it equals the current key at 962. If the next key does equal the current key, the process continues to scan next keys starting at 956. If the next key could not be read in 960, the segment for the current key is installed in 964.

Once it is determined that a next key is not equal to the current key at 962, there has been a key transition. Then, the segment for the current key is installed in the index at 964. Thereafter, at 966, a determination is made as to whether the requested key is covered in the index. If the requested key is not covered in the index, as determined at 966, the process continues at 952. When a key cannot be read at 954, or a requested key is covered in the index in 966, the method ends at 968.

Figure 10:
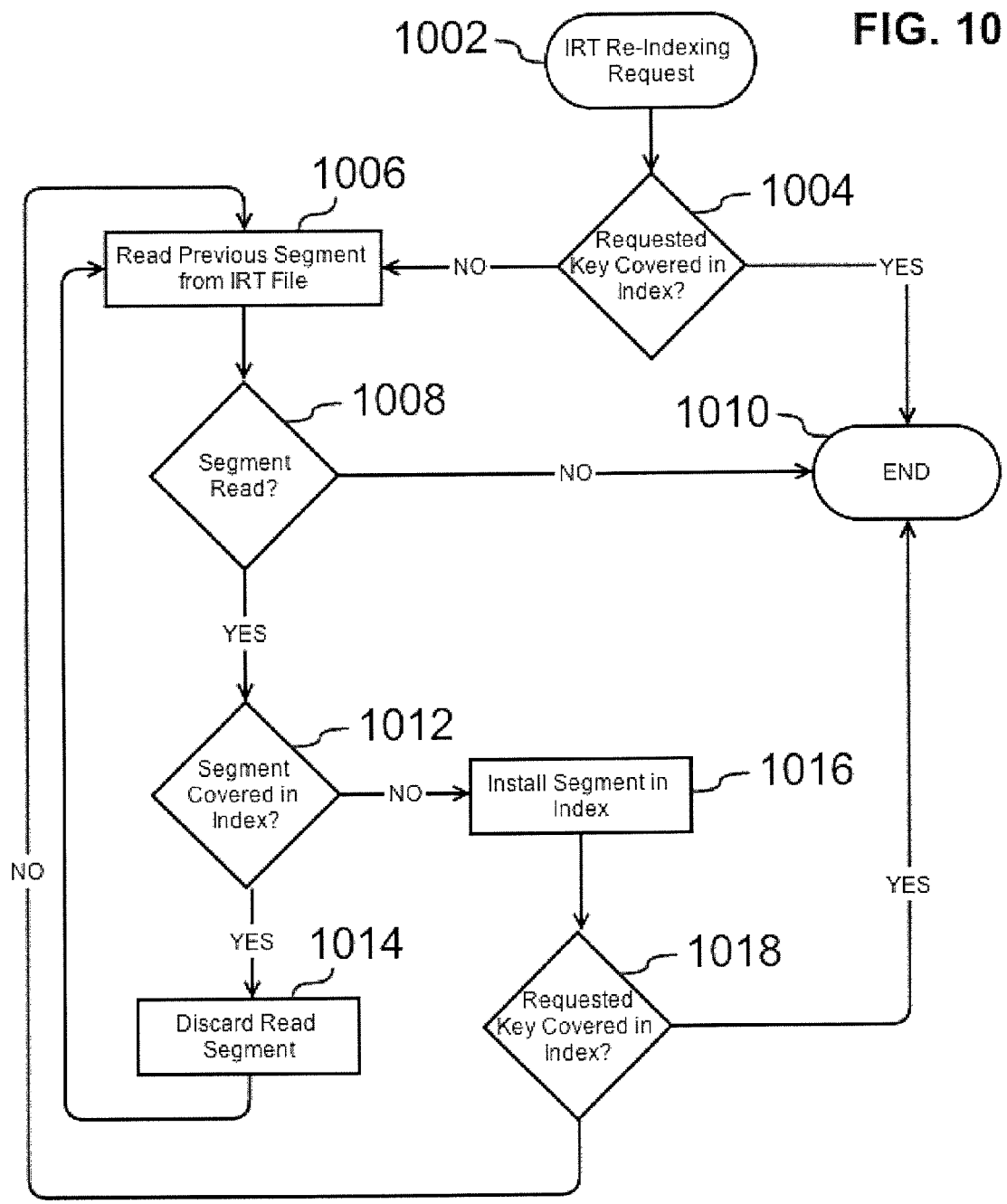
FIG. 10 is a flow chart illustrating an example method of incremental IRT File Re-Indexing, in accordance with aspects of the present invention.

FIG. 10 is a flow chart illustrating aspects of an automated method 1000 of incremental IRT File Re-Indexing. Segments themselves in IRT files may have summaries, and filters may be attached to the summaries. Such a filter's state may be small, e.g., 32 or 64 bits. Among others, a bloom filter may be used. For example, the filter may be configured to enable a determination of keys that are not included in the segment.

At 1002, an IRT re-indexing request is received. A determination is made whether the requested key is covered in the index at 1004. If the requested key is covered, the method ends at 1010. If the key is not covered, a previous segment is read from the IRT file at 1006. At 1008, a determination is made whether the segment could be read. If the segment could not be read, the method ends at 1010. When a segment is read at 1008, it is checked at 1012 to determine if the segment is already covered in the index. If the segment is covered, the segment is discarded at 1014, and the process continues by reading a previous segment at 1006.

A read segment that is not covered in the index is installed in the segment at 1016. Once the new segment is installed, the index is checked to determine if the requested key is covered in the index at 1018. If it is not covered, the process continues by reading a previous segment at 1006, otherwise the process returns.

Aspects presented herein include unique, highly optimized indexing methods for append-only operation. Append only operation may dramatically increase write performance and durability. Aspects presented herein provide a wide variety of techniques and algorithms to implement such functionality and maximize performance.

When information is naturally ordered during creation, there may not be a need for a separate index or index file, e.g., an IRT file, creation or maintenance. However, when information is created unordered anti-entropy algorithms may be required to increase read and lookup performance. Anti-entropy algorithms, e.g., indexing, garbage collection, and defragmentation, work to restore order to such random systems. These operations may be parallelizable and may take advantage of idle cores in multi-core systems. Thus, read performance may be regained, e.g., at the expense of extra space and time. Such extra space may be, e.g., on disk indexes and such time may be involved, e.g., in background work.

Over time, append-only files may get large. Such files may need to be closed and possibly archived. At such a point, new LRT, VRT, and IRT files may be created and new entries may be written to the new files. An ordered, create only VRT file, may, e.g., never be defragmented, because it is already ordered, but may be discarded. Such a file may be, e.g., a log file. When discarding, for example, the oldest log files may be discarded first.

Thus, indexes may be needed in order to achieve efficient data access. The process of creating indexes is indexing. The process may comprise, e.g., creating indexes for several attributes in a relation.

An LRT file may provide both key logging and indexing for a VRT file, while IRT files may provide an ordered index of such VRT files. Forming an index, in an example, may require an understanding of the type of keying and how the on-disk index files are organized.

FIG. 11 illustrates an example logical representation of a segmented column store, in accordance with aspects presented herein.

FIG. 12 illustrates an example logical representation of a compact segmented column store, in accordance with aspects presented herein.

Figure 13:
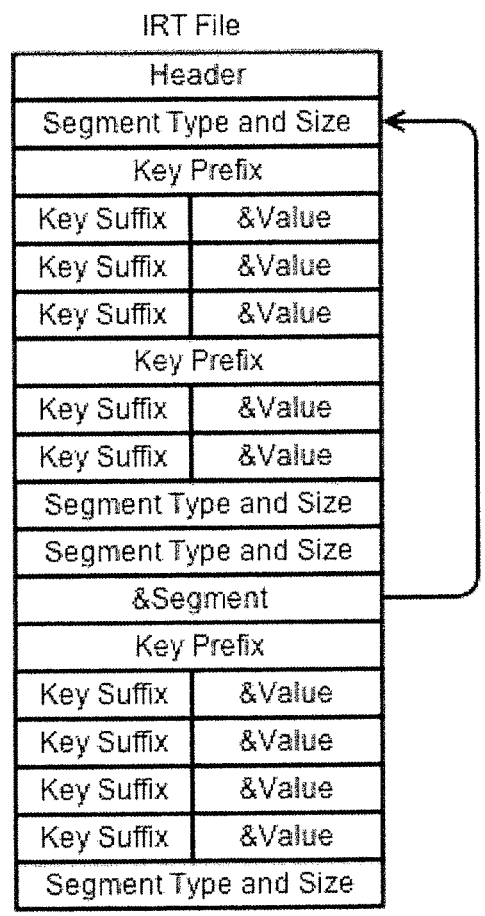
FIG. 13 illustrates an example logical representation of a segment back referencing, in accordance with aspects of the present invention.

FIG. 13 illustrates an example logical representation of a segment back referencing, e.g., with delta compression, in accordance with aspects presented herein.

FIG. 14 illustrates an example logical representation of summary segments, in accordance with aspects presented herein.

LRT File Indexing

In some example implementations, all LRT files may be used as an index. However, ordered LRT files may be used directly and efficiently, while unordered LRT files must be used in their entirety (i.e., the entire file may necessarily be scanned, and an in-memory index created). Thus, unordered LRT files may often be accompanied by separate index files.

Keys within an LRT file may be ordered or unordered. Keys may also be unique or non-unique. This approach may lead to four ordering and uniqueness combinations: (1) Ordered Unique Keys, (2) Ordered Non-Unique Keys, (3) Unordered Unique Keys, and (4) Unordered Non-Unique Keys.

Immutable ordered keys/values (e.g., keys created in sequential order mapped to values that never change) may require only LRT indexes. In such cases, for example, sampling the ordered keys within the LRT may provide LRT summary indexing.

In some example variations in accordance with aspects of the present invention, key sampling may start at the beginning or end of the LRT file, reading the first or the last key and building an in-memory segment for that key. This process may then be repeated by "skipping forward" or "skipping backward" segment size and obtaining the key at that location. Among other things, this method may build in in-memory summary index for the entire LRT file. When non-unique keys are present LRT, indexing may necessarily take contiguous equal keys into account. In such cases, "skipping forward" may necessarily identify a key change at each sampling point and use that change to define the segment boundary. Repeated key values may cause segment sizes to vary and may be handled by variable sized segments.

Efficient LRT summary indexing may thereby be possible only when the LRT file is ordered. This constraint implies the ordered LRT file may not contain key deletions, as those deletions may thereby create unordered keys. In such cases, IRT file indexing may be required for efficient indexing. LRT file indexing may be possible, for example, in files with creation ordered keys/values that are never modified after creation. Other aspects may be handled by separate index files.

IRT File Indexing

When unordered keys are created/modified/deleted, IRT file indexing may be required. IRT file indexing may restore order to the chaos generated by unordered key operations. IRT indexing may involve an anti-entropy algorithm.

IRT files may implement an efficient on-disk representation of ordered, contiguous collections of keys. This representation may enable fast and efficient creation of in-memory summary indexes (e.g., a lightweight modified b+tree).

An IRT file may be composed of segments. Segments within an IRT file may contain in-order contiguous keys. As keys are added, segments may be filled until they reach a write size threshold triggering a write to disk. Additionally, large segments may be split when they reach a split threshold, and small segments may be merged when they reach a merge threshold. In some variations, all segment writes may contain both the segment information and information about the operation performed to be used during incremental re-indexing.

In some example implementations, all segments may be written in append-only mode and record the last indexed position of the LRT/VRT file. This function allows indexing to resume from the last index location (instead of re-indexing the entire LRT/VRT file) in the event of failure. Furthermore, incomplete IRT writes may be detected when the last segment in the IRT file is incomplete, e.g., based on its segment size and/or other parameters. A per-segment CRC may also be used to detect segment completeness and corruption.

In some variations, segments previously written may be effectively pulled forward to the end of the file when modified. Thus, the keys of the segment may exist many times in the same file, but only the last, covering segment may be used for the index, as described in more detail in connection with incremental summary indexing infra.

Additionally, since IRT files may provide order for unordered VRT files, IRTs may be used to impose order on LRT and VRT files themselves. In the above example, when a new segment is written, the LRT and VRT files may also be updated in the order defined by the segment. Over time, this approach may lead to LRT and VRT files with segment ordered, contiguous keys and values. This approach may also have the beneficial effect of ordering "hot spots" as they occur. The flexibility of this approach may allow, e.g., for multiple, non-authoritative index ordered LRT/VRT files and even unordered caches of keys and values.

Incremental IRT File Re-Indexing

In-memory IRT summary indexes may be created by walking the segments of the IRT file backwards from its end.

By definition, each later segment combination may necessarily contain a superset of keys in previously generated segments (e.g., later segments cover key ranges in previous segments).

In some variations, previous segments with keys falling in the range of later segments may be discarded. Logically, the later segments may be the most recent version of the covered key space, and thus earlier segments in that key space may not be the current version.

Incremental IRT file re-indexing may be performed on-demand, based on key requests. Consider an example of an empty summary index and a request for a key (create, update or read). In this case, no index may be available, so re-indexing may necessarily start at the end of the last IRT file and run backwards through the file.

With a random key distribution, this initial case may require 50% of the IRT file to be scanned, on average, for example, before the key space for the key is found. Once scanned, the next random key may have a 50% chance (on average) of already being in the summary index, and if not in the index, on average 50% of the remaining IRT file may have to be scanned. Thus, successive scans may read less and less of the IRT, until the entire summary index is constructed. Contemporaneously, more and more of the summary index will thus have been created, so misses may become less and less likely.

A re-indexing operation, in an example, may be terminated when either the key is found or when the summary index is fully formed. A summary index may be fully formed, e.g., when it is contiguous and the first and last segments are present.

FIGS. 20A and 20B illustrate example logical representations of file layout and indexing, respectively in accordance with aspects presented herein.

Secondary Indexing

Figure 21:
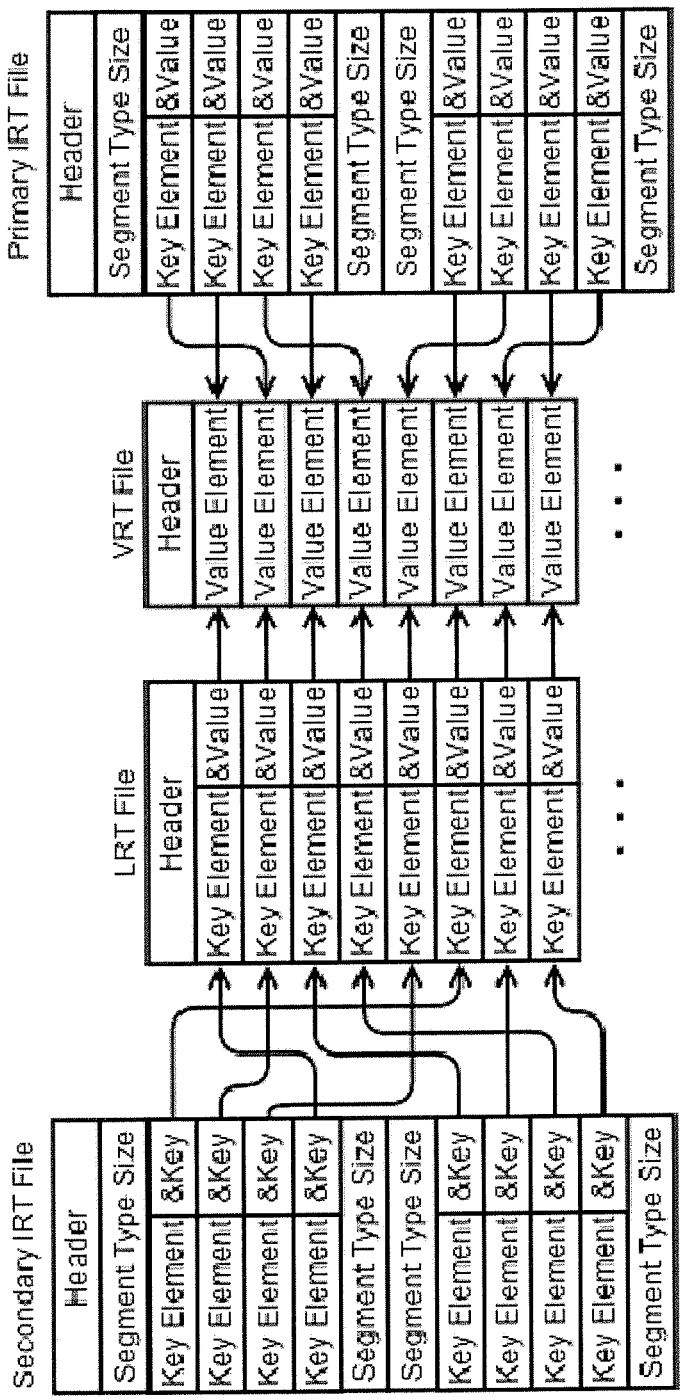
FIG. 21 illustrates an example LRT, VRT, and IRT file secondary indexing according to aspects of the present invention.

Secondary indexes may be, e.g., both unique and non-unique and may be represented by additional IRT files. These secondary IRT files may reference the values in existing VRT files and/or the keys in LRT files. FIG. 21 illustrates an example logical representation of secondary indexes, in accordance with aspects presented herein.

Incremental Summary Indexing

Figure 15:
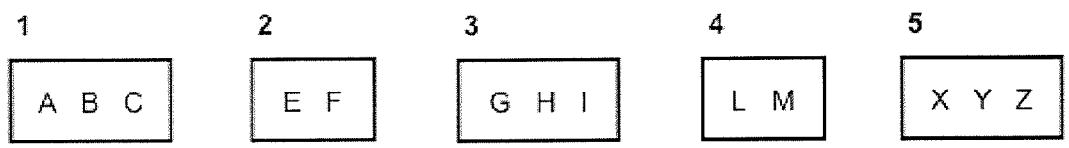
FIG. 15 illustrates an example key space for a fully formed summary index, in accordance with aspects of the present invention.

The examples described supra address fully formed summary indexes. Fully formed summary indexes, e.g., may have contiguous segments and cover the entire key space. When fully formed, a lookup for any key may have a definitive answer; e.g., it is either present or not present. FIG. 15 illustrates an example key space for a fully formed summary index, in accordance with aspects presented herein. FIG. 15 illustrates a key space A-Z, comprising segments 1-5. This key space is sparse and has a maximum segment size, e.g., of 3. In this example, the segment numbers are not present in the segments themselves, but are used to identify the segments in the figure. A lookup for any key in this example will return a definitive result.

However, among others, there are two circumstances in which fully formed indexes are not possible—on system start-up when in memory summary indexes must be built and when memory pressure demands purging of both segment information and segments.

Figure 16:
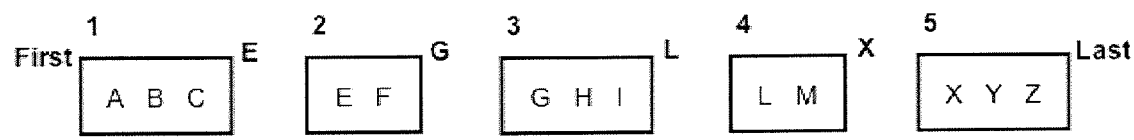
FIG. 16 illustrates an example annotated summary index segment, in accordance with aspects of the present invention.

Thus, it may be important for in-memory segments to have the ability to represent incremental/incomplete indexes. This may be accomplished, in an example, by indicating first and last segments and indicating key space ranges within segments. FIG. 16 illustrates an annotated summary index segment of the example from FIG. 15, in accordance with aspects presented herein. In FIG. 16, the annotated segments may indicate first and last segments (e.g., segments 1 and 5), each segments key range (e.g., segment 1 has a key range of "A" up to but not including "E") and may contain keys covered by their respective key ranges.

Figure 17:
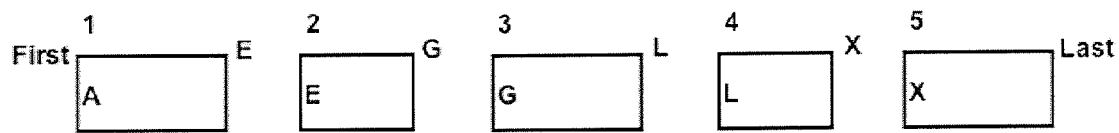
FIG. 17 illustrates an example of a compact annotated summary index, in accordance with aspects of the present invention.

FIG. 17 illustrates an example of a compact annotated summary index, corresponding to the example index in FIG. 15, in accordance with aspects presented herein. In this example, segments may be represented compactly by their start key, their next segment's start key, first and last flag bits and a pointer to the segment's on-disk location. This compact representation may describe the key range for each segment without specifying all keys within a segment.

Each segment may cover a key range. Once a key range is covered it may necessarily always be covered, even in the presence of key removals/deletions. Thus, when the key at the beginning of a segment is removed/deleted, it may be retained in the segment but being marked as deleted. This may only be necessary, e.g., for the first key in each segment.

In an example, a key range of a segment may indicate where a key may be located but not indicate whether the key exists. An optimization may be made by adding filter results which summarize the keys present in a segment. For example, a bloom filter may be used to probabilistically determine which keys may be present (with a high probability) and definitely determine which keys are not present. Thus, a bloom filter, e.g., may provide a compact, probabilistic filter which may be consulted without reading all keys in a segment.

Figure 18:
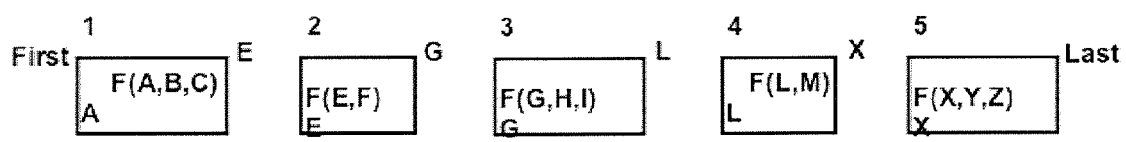
FIG. 18 illustrates example compact annotated summary index segments with filters, in accordance with aspects of the present invention.

FIG. 18 illustrates example compact annotated summary index segments with filters, in accordance with aspects presented herein. With the additional annotation information, for which an example is presented in FIG. 18, incremental summary indexes may be built and key lookups may fall into one of the following categories: (1) present, (2) not present, and (3) unknown.

Figure 19:
FIG. 19 illustrates an example incremental summary index, in accordance with aspects of the present invention.

FIG. 19 illustrates an example incremental summary index, in accordance with aspects presented herein. The incremental summary index illustrated in FIG. 19 is missing segments. Although the exact number of missing segments may not be known, the fact that there are missing segments may be determined from known segments.

FIG. 19 illustrates two of many cases. First, FIG. 19 illustrates that one or more segments are missing from the interior of the summary index (i.e. segment 2). Second, FIG. 19 illustrates that one or more segments are missing from the end of the summary index (i.e. segment 5).

In both cases missing segments may be detected by determining, e.g., that the segment indicated by the next segment annotation does not exist. In the first case, E is not equal to G, indicating that there are missing segments. In the second case, X is not equal to the next segment's start key because there is no next segment.

Additionally, in FIG. 19, segment 4 does not indicate it is a Last segment even though it is at the end of the summary index. This may enable a determination that there are missing segments following segment 4. Although multiple ways of determining missing segments has been described, only one of these conditions may need to be detected in order to determine that there are missing segments at the end of the summary index. Similarly, if the first segment in the summary does not indicate it is first, a determination may be made that segments are missing at the beginning of the summary index.

A key falling inside a missing segment space may have an Unknown state (i.e. it is neither Present nor Not Present). In this example, more of the summary index may necessarily be built before the Key's status may be determined.

When incremental indexing from disk is being performed the status of unknown keys may be determined, in an example, by reading more of the index file from disk and building the summary index as segments are read. Once the key falls within a known segment's range, that segment may be loaded and the exact status of the key may be determined.

Finally, a re-indexing operation may be complete, e.g., when there are no missing segments (e.g., the key/segment space is contiguous and both start and end segments are present).

Initialization of In-Memory Summary Indexing

When a datastore is mounted, an in-memory summary index may be created from its LRT and IRT files. This may require the mounting process to understand how to interpret and combine LRT and IRT file indexes.

If a datastore is composed of ordered immutable keys only LRT files may be present. The mounting process in this case may build the in-memory summary index from the LRT files using the process described in "LRT File Indexing."

A datastore composed of unordered keys may have both LRT files and IRT files. In this example, LRT files may be completely unordered, partially ordered or completely ordered. LRT ordering may be imposed by IRT ordering. Thus, creating an index directly from LRTs may be possible but may be inefficient unless the LRT is known to be totally ordered, in which case an IRT index for that file is not needed.

Thus, in-memory summary indexes may necessarily be created from IRT files first. This may be accomplished by walking the IRT file backwards as outlined supra in connection with IRT File Indexing.

After the IRT summary index is created, LRT files may be examined. First, it may be possible that IRT indexes did not contain all of the data from the LRTs. This may be determined, e.g., by recording the "Last Indexed Position" of each LRT file during IRT summary index generation. For each LRT file, when the last indexed position is not at its end, an in-memory summary index may be generated from the LRT file for the un-indexed items starting directly after the last indexed position. In this way all data in the LRT files may be indexed.

Finally, there may be fully ordered LRT files without associated IRT files (e.g. LRT files may have been created during defragmentation). Fully ordered LRT files may be added to the in-memory summary index as described in more detail supra in connection with LRT File Indexing.

Once in-memory summary indexing is complete, including, e.g., seeding the index for incremental index regeneration, the datastore may be considered "mounted" and may be accessed by applications.

While aspects of this invention have been described in conjunction with the example aspects of implementations outlined above, various alternatives, modifications, variations, improvements, and/or substantial equivalents, whether known or that are or may be presently unforeseen, may become apparent to those having at least ordinary skill in the art. Accordingly, the example illustrations, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed is:

1. A computer assisted method for indexing information stored in a data-store as a segment tree, the method including:
   receiving a new index request for the segment tree driven by at least one of a create operation, a read operation, an update operation, and a delete operation;
   creating an index in response to the new index request, the index comprising at least one segment, a first flag, and a last flag, wherein each segment comprises index summary information, wherein the index summary information comprises at least one selected from a group consisting of a covered key range within the segment, a start key within a next segment, and key summary filters; and
   storing the index in memory;
   organizing an index file, wherein organizing includes at least one of splitting a segment and merging a segment;
   covering a key space by indicating at least a first key and a next segment key in each segment and summary segment;
   indicating a deleted first key within a segment and a summary segment;
   maintaining a covered key space during organization operations; and
   streaming index changes to an index file in an append-only manner.

2. The method of claim 1, wherein creating the index comprises: scanning a segmented index file by segment to identify each of a plurality of keys and their corresponding range; and
   creating a summary index based on the identified keys and their corresponding range.

3. The method of claim 2, further comprising:
   determining that the summary index is complete when contiguous segments have been identified that cover an entire key space of the index.

4. The method of claim 2, wherein segments identify segments they modify through segment back referencing.

5. The method of claim 2, wherein summary segments identify each of a plurality of first keys and their corresponding segments.

6. The method of claim 1, wherein each segment comprises at least one selected from a group consisting of index summary information, key elements, key pointers, and value pointers.

7. The method of claim 1, wherein the index summary information comprises a key summary filter, and wherein the key summary filter is a bloom filter.

8. The method of claim 1, wherein each segment comprises range covering indexes.

9. The method of claim 1, further comprising:
   incrementally regenerating an in-memory index from a plurality of segments.

10. The method of claim 9, wherein each segment comprises range covering indexes, the method further comprising:
    incrementally regenerating an in-memory index using the range covering indexes.

11. The method of claim 1, wherein the information is organized in an append-only manner.

12. The method of claim 11, wherein the index files comprise at least one of unordered keys and ordered keys, the index files being append-only index files.

13. The method of claim 12, further comprising:
    incrementally regenerating an in-memory index from ordered keys using key sampling.

14. The method of claim 13, wherein each segment comprises a segment size boundary, and wherein the key sampling is performed at the segment size boundaries.

15. The method of claim 14, wherein key sampling comprises searching for key transitions in order to identify duplicate keys.

16. The method of claim 1, wherein a segment is split based on a split threshold.

17. The method of claim 16, wherein the split threshold is determined based on at least one of policy and dynamic optimization criteria.

18. The method of claim 1, wherein a segment is merged based on a merge threshold.

19. The method of claim 18, wherein the segment merge threshold is determined based on at least one of policy and dynamic optimization criteria.

20. The method of claim 1, wherein the index is distributed.

21. The method of claim 20, wherein the distributed index is subdivided among nodes based on key ranges.

22. The method of claim 21, wherein multiple nodes comprise the same key range.

23. The method of claim 1, further comprising:
creating multiple indexes each having a different order;
creating multiple indexes each having different covering key sets; and creating multiple indexed caches of keys and values based on access patterns.

24. The method of claim 1, further comprising: organizing LRT and VRT files based on index order; and creating non-authoritative index ordered LRT and VRT files.

25. An automated system for indexing information stored in a data-store as a segment tree, the system comprising:
means for receiving a new index request for the segment tree driven by at least one of a create operation, a read operation, an update operation, and a delete operation;
means for creating an index in response to the new index request, the index comprising at least one segment, a first flag, and a last flag, wherein each segment comprises index summary information, wherein the index summary information comprises at least one selected from a group consisting of a covered key range within the segment, a start key within a next segment, and key summary filters; and
means for storing the index in memory;
means for organizing an index file, wherein organizing includes at least one of splitting a segment and merging a segment;
means for covering a key space by indicating at least a first key and a next segment key in each segment and summary segment;
means for indicating a deleted first key within a segment and a summary segment;
means for maintaining a covered key space during organization operations; and
means for streaming index changes to an index file in an append-only manner.

26. A computer program product comprising a non-transitory computer readable medium having control logic stored therein for causing a computer to perform indexing information stored in a data-store as a segment tree, the control logic code for:
receiving a new index request for the segment tree driven by at least one of a create operation, a read operation, an update operation, and a delete operation;
creating an index in response to the new index request, the index comprising at least one segment, a first flag, and a last flag, wherein each segment comprises index summary information, wherein the index summary information comprises at least one selected from a group consisting of a covered key range within the segment, a start key within a next segment, and key summary filters; and
storing the index in memory;
organizing an index file, wherein organizing includes at least one of splitting a segment and merging a segment;
covering a key space by indicating at least a first key and a next segment key in each segment and summary segment;
indicating a deleted first key within a segment and a summary segment;
maintaining a covered key space during organization operations; and
streaming index changes to an index file in an append-only manner.

27. An automated system for indexing information stored in a data-store as a segment tree, the system comprising:
at least one processor;
a user interface functioning via the at least one processor; and
a repository accessible by the at least one processor; wherein the at least one processor is configured to:
receive a new index request for the segment tree driven by at least one of a create operation, a read operation, an update operation, and a delete operation;
create an index in response to the new index request, the index comprising at least one segment, a first flag, and a last flag, wherein each segment comprises index summary information, wherein the index summary information comprises at least one selected from a group consisting of a covered key range within the segment, a start key within a next segment, and key summary filters; and
store the index in memory;
organizing an index file, wherein organizing includes at least one of splitting a segment and merging a segment;
covering a key space by indicating at least a first key and a next segment key in each segment and summary segment;
indicating a deleted first key within a segment and a summary segment;
maintaining a covered key space during organization operations; and
streaming index changes to an index file in an append-only manner.

* * * * *